April 7, 1970  J. F. SCUDDER ET AL  3,504,605

PHOTOGRAPHIC CAMERA WITH RETRACTILE LENS HOUSING

Filed Jan. 18, 1967

JAMES F. SCUDDER
FREDERIC A. MINDLER
INVENTORS

BY
ATTORNEYS

United States Patent Office 3,504,605
Patented Apr. 7, 1970

3,504,605
PHOTOGRAPHIC CAMERA WITH RETRACTILE LENS HOUSING
James F. Scudder and Frederic A. Mindler, Rochester, N.Y., assignors to Eastman Kodak Company, Rochester, N.Y., a corporation of New Jersey
Filed Jan. 18, 1967, Ser. No. 610,087
Int. Cl. G03b 17/04
U.S. Cl. 95—11                8 Claims

ABSTRACT OF THE DISCLOSURE

A photographic camera with a retracting lens housing having opposing torsional springs urging the housing to an extended position and a latch mechanism releasably retaining the housing in a retracted position. The torsional springs include an elongate central section and a movable leg section extending at an angle relative to the central section to engage the housing and urge the housing toward its extended position. The latch mechanism includes a plurality of movable release members having a portion thereof accessible from the exterior of the camera for releasing the members and thereby permitting movement of the housing to its extended position.

---

The present invention relates to photographic cameras and more particularly to such cameras having slidably retractile lens housings.

For many years, it has been common practice to provide a photographic camera with means for extending and retracting the objective lens housing so that the camera is relatively compact and convenient to carry when the housing is in its retracted position. One type of camera embodying this feature comprises a slidable or telescoping lens housing structure which may include spring means for moving the housing to its extended position and a releasable latch mechanism that retains the housing in its retracted position when the camera is not being used.

The present invention relates to a camera of this general type, a primary object of the invention being to simplify the construction and mode of assembly of the retractile lens housing structure and the latching mechanism associated therewith. Another object of the invention is to facilitate the employment of such a retractile lens housing construction in relatively small cameras in which space requirement impose severe limitations on the size and disposition of the various elements of the retractile lens housing structure.

According to the present invention, there is provided a movable lens assembly having a housing and supporting the camera objective lens, the assembly being urged toward an extended position by opposing torsional springs within the housing. A latch releasably retains the assembly in a retracted position in which the front of the housing is flush with the camera casing.

Figure 1:
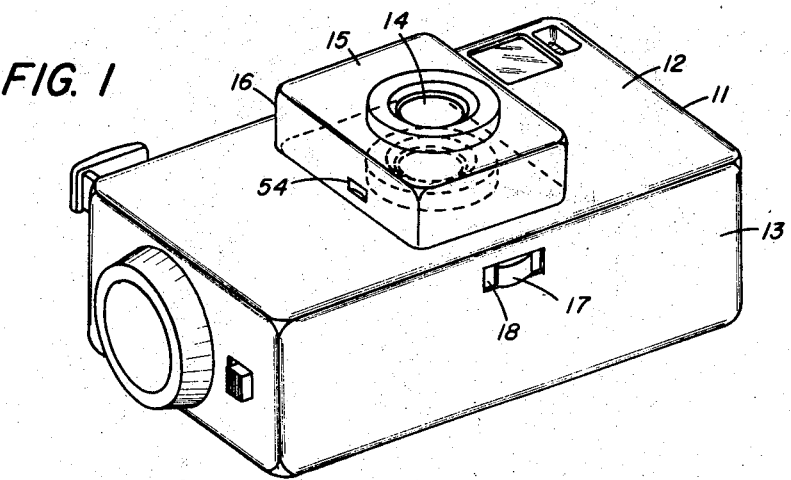
Figure 2:
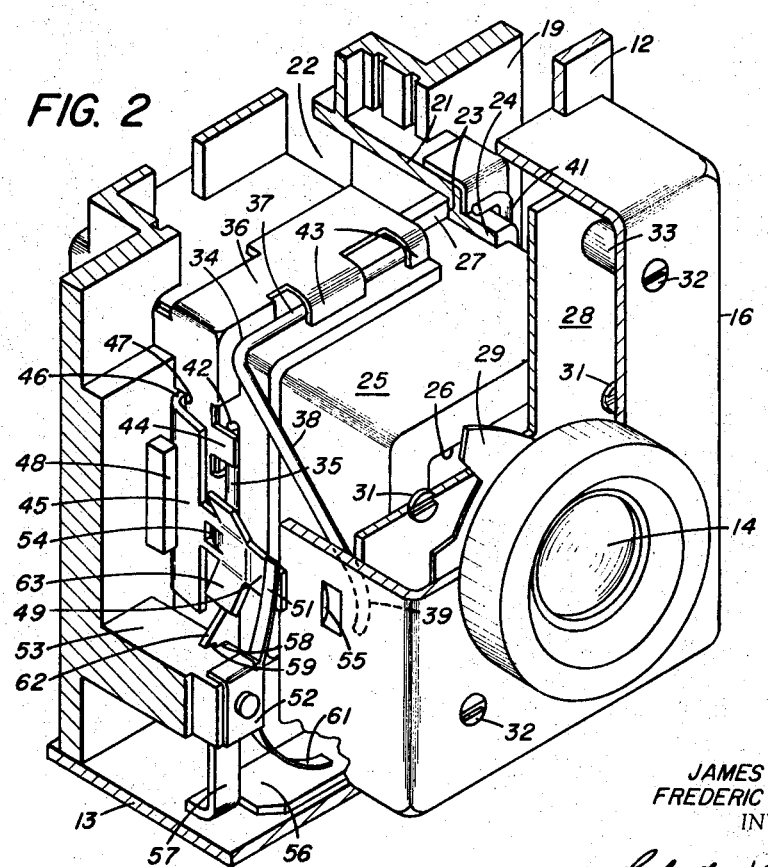

These and other important objects and advantages of the invention will be readily apparent from the following detailed description, reference being made to the accompanying drawings in which:

FIG. 1 is a perspective view of a camera incorporating a retractile lens housing according to a preferred embodiment of the present invention; and FIG. 2 is an enlarged partial perspective view of the camera depicted in FIG. 1, with portions of the camera cut away to show the internal construction of the lens housing and the camera structure associated therewith.

As illustrated by FIG. 1 of the drawings, the subject camera, shown lying on its back, comprises a body casing 11, including a front wall 12 and a bottom wall 13. The objective lens 14 is supported on the forward wall 15 of the rectangular lens housing shell 16. The lens housing shell 16 is depicted in its extended position in which the lens is spaced at its proper focal distance from the film plane in the camera, and is movable rearwardly to a retracted position, shown in broken lines, in which the forward wall 15 of the housing shell 16 is substantially flush with the surrounding front wall 12 of the casing. As will be explained in more detail, the lens housing is retained in its retracted position by a latch mechanism. A release button 17 extends through an aperture 18 in bottom wall 13 and, when depressed, releases the latch mechanism to allow the lens housing to be returned automatically to its extended position by resilient spring means.

Referring now to FIG. 2, the camera casing 11 encloses a main support frame 19, which preferably is formed of molded plastic or die cast metal and which includes a rectangular sleeve portion 21 defining a rectangular opening 22 extending through the main support frame about the axis of lens 14. Toward its forward end, sleeve portion 21 defines an inwardly projecting annular shoulder 23 adjoining the forwardly projecting lip portion 24 of the sleeve, whereby the transverse dimensions of the sleeve and of the opening 22 are reduced along the lip portion 24 of the sleeve. A lens housing support block 25, similarly provided with a rectangular opening 26 extending therethrough, is installed in opening 22 through the rearward end thereof and is slidably supported for movement along the axis of the lens by the internal surfaces of lip portion 24. The forward movement of block 25 is limited by the engagement of an annular flange 27 at the rearward end of block 25 with the internal shoulder 23 in sleeve portion 21.

Due to the perspective aspect of FIG. 2, not all of the internal components comprising the invention are fully visible, but it should be understood that corresponding components also are provided at the opposite side of the illustrated structure, in substantially allochiral relation to those shown.

A mechanism plate 28, including the camera shutter 29 and/or diaphragm (not shown), is affixed to support block 25 by screws 31 and, hence, is slidably movable with the support block. The mechanism plate, in turn, movably supports lens housing shell 16 attached thereto by screws 32 extending through spacer sleeves as shown at 33. Sleeves 33 are of a proper length to establish the lens at a predetermined distance from the film plane of the camera when the housing shell is in its extended position as defined by the engagement of flange 27 with shoulder 23.

As mentioned above, the camera is provided with resilient spring means for urging toward its extended position the movable assembly comprising the lens housing support block 25 and the various components movably supported thereto. Such resilient means comprise substantially identical upper and lower torsional spring members 34 and 35, respectively, which are supported within the camera by a symmetrical metal collar member 36 surrounding sleeve portion 21 rearwardly adjacent lip 24. Collar member 36 is installed, along with the spring members, and is cemented or otherwise affixed to sleeve portion 21 before the mechanism plate 28 is attached to support block 25. As illustrated by the upper spring member 34, each such member comprises a resilient wire having a straight central portion, as identified by numeral 37, and bent at approximately a right angle at one end of the central portion to provide a movable leg 38, curved at its free end as shown in broken lines at 39. At the opposite end of the central portion, the wire is similarly bent at substantially a right angle to form a straight stationary leg angularly disposed to the plane defined by the central portion 37 and the movable leg 38. In FIG. 2, a portion of the stationary leg of upper spring member 34 can be seen at 41, with the end of the corresponding leg of the lower spring member 35 being visible at 42. As illustrated in FIG. 2, the spring members 34 and 35 are retained within the camera by spring anchoring means comprising ears 43 and 44. The straight central portions of the upper and lower spring members are rotatably held in parallel relation to one another against the collar member 36 adjacent the upper and lower surfaces, respectively, of lip 24, by the inwardly bent ears 43 on the collar member. Lateral movement of the spring members, on the other hand is restricted by similar ears 44, which maintain the stationary legs 41, 42 of the spring members adjacent the side surfaces of the lip 24.

When the mechanism plate is installed on the forwardly extended support block 25, the rearward surface of the plate is engaged at opposite sides of the support block by the curved end portions of the movable spring member legs, one of which extends upwards and the other downwardly (39). To provide resilient engagement between the spring members and the mechanism plate in its extended position, the installation of the plate displaces the free ends of the movable spring legs rearwardly by flexing the movable legs and by twisting the central portions of the spring members, the stationary legs of which prevent rotation of the corresponding adjacent ends of the central portions. When the movable assembly is manually urged in a rearward direction to its retracted position, the movable legs are further flexed and the central spring portions are further twisted by the torsional force applied thereto by the movable legs. During such movement, the free end 39 of the upper movable spring leg 38 slides downwardly in contact with the rearward surface of the mechanism plate, while the corresponding free end of the lower movable spring leg simultaneously slides upwardly in contact with the rearward plate surface at the opposite side of the support block 25. Thus, the resilient forward force exerted on the mechanism plate by the spring members is at all times exerted at two points oppositely related to the axis of movable block 25, whereby the resultant force is along the path of movement of the block to minimize binding of the block within the guide surfaces defined by lip 24.

To latch the movable assembly in its retracted position, in which the rearward portion of the housing shell 16 surrounds the spring members and the forward portion of collar member 36, a pair of identical latch members, one of which is shown at 45, are located at opposite sides of the collar member. Each latch member is supported for rocking movement by a lip 46, retained in engagement with a notch 47 in collar member 36 by a projection 48 on main support frame 19, with sufficient space being provided between the latch members 45 and collar member 36 to accommodate the side walls of the retracted housing shell. A forwardly extending arm 49 on each latch member overlaps the rearward edge of lens housing shell 16 and is held in resilient contact therewith by a resilient upper arm 51 of a latching spring member 52 attached to a projection 53 on support frame 19.

Each of the arms 49 of the latch members includes an inwardly extending latching tooth 54 aligned with a corresponding forward facing latching surface or latching notch 55 in the exterior side wall of the lens housing shell 16. As the shell is moved to its retracted position, the latch members 45 are cammed outwardly by the engagement of the latching teeth with the rearward edge of the shell and remain in that position until the housing shell reaches its retracted position, whereupon the latching teeth 54 enter the latching notches 55 to retain the lens housing shell and other elements of the movable assembly in retracted position against the influence of springs 34 and 35.

In order to release the latching teeth from the notches in housing shell 16, to allow the movable assembly to return to its extended position, the release button 17 (FIG. 1) is provided on the lower surface of a latch release bar 56 located within the camera body casing adjacent the lower wall member 13. As shown at 57, a vertical cam arm is provided at each end of the release bar and is slidably supported for vertical movement in a slot 58 in the adjacent projection 53, with the lower position of the arm being defined by the engagement of nose portion 59 with the upper surface of projection 53. Lower resilient straps, as shown at 61, extend downwardly from each of the latching spring members 52 and engage the corresponding ends of bar 56 to urge the bar and its cam arms 57 to the illustrated lower position. At the top end of each of the vertical cam arms a sloping cam surface 62 is provided in alignment with an angularly depending ear 63 on the forwardly extending arm 49 of the corresponding latch member 45. Accordingly, when the operator presses the latch release button 17, the release bar and its vertical cam arms 57 move upwardly, whereby the sloping cam surfaces 62 of the cam arms engage the adjacent depending ears and move the latch members 45 outwardly to release the lens housing shell 16 by withdrawing the latching teeth 54 from the corresponding latching notches 55. While two opposite ears are shown on latch member 45, only the lower depending ear is functional, the opposite ear being provided for purposes of symmetry so that identical components can serve as either of the two latching members incorporated in the camera.

Since various modifications may be made without departing from the spirt of the invention, the foregoing detailed description of a preferred embodiment is to be considered as illustrative only and not as limiting the scope of the invention as defined by the appended claims.

We claim:
1. A photographic camera comprising:
  (a) a body casing;
  (b) a movable assembly including:
    (1) an objective lens
    (2) a housing member, and
    (3) a rigid support element substantially within said housing member for supporting said housing member and said lens;
  (c) a support frame affixed to said casing for movably supporting said support element to allow movement of said movable assembly between
    (1) an extended position in which at least a portion of said housing member projects beyond said body casing, and
    (2) a retracted position in which the forward portion of said housing member is adjacent said body casing; and
  (d) resilient means for urging said movable assembly toward said extended position, said resilient means comprising a spring member adjacent said support frame and receivable within said housing member when said movable assembly is in said retracted position.

2. A photographic camera as claimed in claim 1, wherein said support element is located substantially within said body casing in both the extended position and the retracted position of said movable assembly.

3. In a photographic camera having a body portion and a lens assembly, wherein the lens assembly is movable in a predetermined path of movement relative to the body portion between an extended position for taking pictures and a retracted position, the improvement comprising:
  a spring member for urging the lens assembly toward the extended position of the assembly, said spring member including:
    an elongate central section supported laterally of the predetermined path of movement of said assembly, and
    a movable leg extending at an angle from said elongate central section,
  means for anchoring said central section relative to the body portion, said means permitting twisting of said elongate central section at a portion adjoining said leg but preventing twisting of said elongate section at a portion spaced from said leg; and an abutment surface on said lens assembly, said abutment surface engaging said leg during movement of said lens assembly toward the retracted position thereof, to thereby impart angular movement to said leg about said central section and twisting movement of the adjoining portion of said central section, said anchoring means preventing twisting movement of the spaced portion of said central section, whereby movement of said assembly toward the retracted position thereof will impart torsional distortion to said elongate central section to thereby urge said assembly toward its extended position.

4. A camera according to claim 3 including:
(a) means defining a forwardly extending generally rectangular lip on said body portion; and
(b) a generally rectangular collar member surrounding said lip, said collar member including means for rotatably supporting said elongate central section of said spring member.

5. A camera according to claim 4 in which said spring anchoring means comprises a stationary leg extending from said elongate central section at a location spaced from said movable leg and abutting against a forwardly facing surface of said collar.

6. A camera according to claim 4 including latch means for releasably engaging said lens assembly to releasably retain said movable assembly in said retracted position, said latch means being movably supported within said body portion by said collar member.

7. In a photographic camera having a body portion and a lens assembly, wherein the lens assembly is movable relative to the body portion between an extended position for taking pictures and a retracted position, the improvement comprising:
resilient means for urging the lens assembly toward the extended position of the assembly;
latch means releasably engageable with said lens assembly for releasably retaining said assembly in the retracted position thereof;
said latch means including oppositely disposed latching surfaces defined by surface means on said movable assembly, and latch members located within said casing and adapted to engage corresponding ones of said latching surfaces when said assembly is in the retracted position thereof;
release means for releasing said latch means to allow said assembly to be moved to the extended position of the assembly by said resilient means, said release means comprising a movable release member provided with cam means to release said latch members from engagement with said latching surfaces upon movement of said release member from a first position to a second position; and,
means accessible from the exterior of said camera for moving said release member from said first position to said second position.

8. A camera according to claim 7 in which said latching surfaces are defined by notches provided in opposite sides of said body portion, said notches being within said body portion when said assembly is in said retracted position and beyond said body portion when said assembly is in said extended position.

References Cited

UNITED STATES PATENTS

| 1,718,173 | 6/1929 | Muller | 95—32 |
| 1,950,884 | 3/1934 | Green | 95—39 |
| 2,126,312 | 8/1938 | Crumrine | 95—32 |
| 2,358,321 | 9/1944 | Fassin | 95—32 |

FOREIGN PATENTS 732,198　2/1943　Germany.

NORTON ANSHER, Primary Examiner
F. L. BRAUN, Assistant Examiner

U.S. Cl. X.R.
95—39